Oct. 10, 1939.  A. F. ERICSON  2,175,431
HYDRAULIC BRAKE WHEEL CYLINDER
Filed April 11, 1938

Inventor
Anton F. Ericson

Blackmore, Spencer & Flint
Attorneys

Patented Oct. 10, 1939

2,175,431

UNITED STATES PATENT OFFICE 2,175,431

HYDRAULIC BRAKE WHEEL CYLINDER

Anton F. Ericson, Dayton, Ohio, assignor to General Motors Corporation, Detroit, Mich., a corporation of Delaware Application April 11, 1938, Serial No. 201,264

6 Claims. (Cl. 60—54.6)

This invention relates to hydraulic motors and has been designed to function as the wheel cylinder of a hydraulic brake system.

An object of the invention is to provide an improved seal between the relatively moving parts of the wheel cylinder of such a system.

A further object is to associate with the relatively movable parts a diaphragm of flexible incompressible material and retaining means therefor to prevent leakage around the diaphragm and to prevent sponginess.

Other objects such as efficiency in operation and low cost of manufacture will be understood from the following description.

Figure 1:
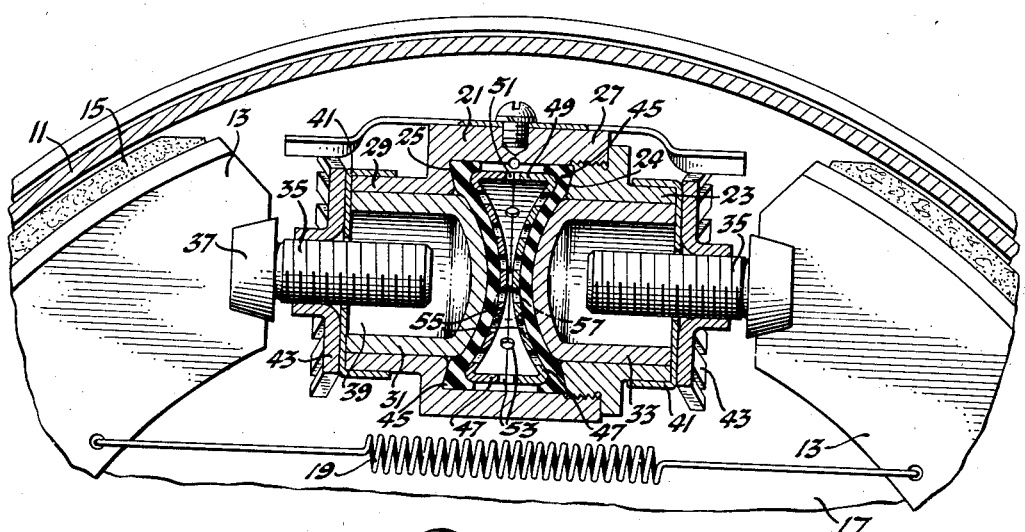
Figure 1 is a vertical section through a wheel cylinder incorporating one embodiment of the invention.
Figure 2:
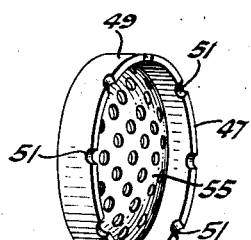
Figure 2 is a detail in perspective of a part used in this form of the invention.

In the drawing, numeral 11 is used to represent a brake drum and 13 the shoes for frictional engagement with the drum. As is customary the shoes have friction facings 15. The shoes are to be anchored in any conventional way to a relatively fixed cover plate 17 and are withdrawn from contact with the drum by a conventional releasing spring 19.

The wheel cylinder is secured to the cover plate 17 by any convenient means, not shown. This cylinder is formed by threading together two parts 21, 23. The part 21 has an annular radially extended and peripherally undercut shoulder 25 between its ends 27 and 29. A piston 31 slides in end 29. The second part 23 is formed with a tapered wall 24 and is threaded into 27 as shown. Within part 23 there is slidably mounted a second piston 33. Between the shoes and the pistons are threaded stems 35 having heads 37 which are forked to straddle the webs of the shoes. The ends of these stems enter freely into recesses 39 in the pistons. Cups 41 embrace the ends of the cylinder. These cups seat on the ends of the pistons and also on the ends of the cylinder when the pistons are in their retracted positions as shown on the drawing. To adjustably determine the release position of the shoes there are nuts 43 adjacent the cups 41, these nuts being threaded to the stems 35. In this form of the invention the heads of the pistons have a rounded contour, their convex surfaces engaging diaphragms 45. The marginal walls of the diaphragms are shaped to fit the angular region at 24 and 25. Between the two diaphragms are cups 47. Each cup has an annular wall 49, one edge being formed with semi-circular notches 51. When assembled together the notches of the two cups register to form circular openings 53. The apertured bottom walls 55 of the cups are depressed within the region of the annular walls but they are not depressed to an extent such as to cause the two bottom walls to contact. The dome end of the piston and the correspondingly shaped part 55 determines the shape of the diaphragm when the brake is released. When part 23 is threaded into part 21 the cups 47 exert sufficient pressure on the marginal walls of the rubber diaphragms to prevent leakage. When the hydraulic medium enters the cylinder through opening 57 it passes through the apertures in walls 55 and flattens the diaphragms thereby reciprocating the pistons and spreading the shoes into frictional contact with the drum. During this movement the diaphragm moves away from the walls 55. Subsequent to the application of pressure upon the fluid for brake action and when the spring 19 restores the pistons the diaphragm remains in contact with the rounded surface of the piston and finally comes to rest against the retaining surface 55. By means of this wall 55 therefore the diaphragm is held to the contour of the piston and any sponginess which might be caused by the admission of air between the piston and the diaphragm is avoided. This is insured because in the position of rest the diaphragm engages the apertured wall 55 which corresponds in contour to the adjacent end wall of the piston.

Figure 3:
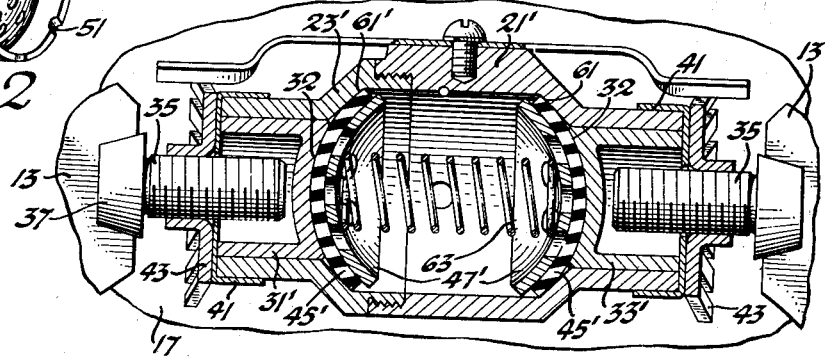
Figure 3 is a vertical section showing a second form of the invention.
Figure 4:
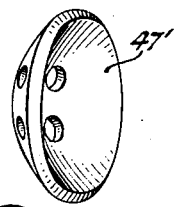
Figure 4 is a perspective view of a detail used in the assembly shown in Figure 3.

The same objective may be obtained with a piston having a concave shaped end wall. Such a construction is shown in Figure 3 where pistons 31' and 33' have concave end faces 32. The operating parts outwardly from the pistons and between the pistons and the brake shoes are the same as are shown in Figure 1 and are similarly marked. The cylinder is formed by threading together two parts 21' and 23'. Part 21' has a tapered wall 61 between its portions of larger and smaller diameter. Part 23' is formed with a similar wall marked 61'. The piston faces in the retracted position of the pistons merge into these walls 61, 61' and are engaged by the diaphragms 45' as shown in the figure. In this embodiment of the invention there are two apertured discs 47' so shaped that their remotely located walls conform to the outline of the faces of the pistons, and the diaphragms are received between the walls of the piston and the discs. A spring 63 is located between these discs and is prestressed into engagement with them. The stress is such as to hold the discs in the position shown and to exert sufficient pressure to prevent leakage around the marginal wall of the diaphragms. When hydraulic medium is forced into the cylinder its pressure supplements the pressure of spring 63 and holds the marginal parts of the diaphragms firmly against the cylinder wall. The fluid pressure passes through the openings in disc 47' and expands the diaphragm and moves the pistons to cause the shoes to frictionally engage the drum. In doing so the diaphragm is moved away from the central portion of the discs. When the fluid pressure is released the brake shoe releasing spring restores the parts to the position shown, the fluid moving through the apertures of the disc. The diaphragms finally engage the retaining discs which serve to hold the contour of the diaphragms to that of the piston faces and to avoid the sponginess before referred to.

I claim:

1. In a hydraulic motor, a cylinder having a portion of larger diameter and a portion of smaller diameter, a piston traversing only the portion of smaller diameter, a diaphragm located substantially wholly in and of a diameter corresponding to the larger diameter portion of the cylinder, one side of said diaphragm engaging a face of said piston, an apertured retainer on the other side of said diaphragm and of substantially the same diameter as the large diameter portion of the cylinder, said piston face and the wall of the retainer adjacent the diaphragm having correspondingly rounded contours whereby the diaphragm may be flexed away from the retainer to move the piston but upon return movement may be held by the retainer to the contour of the piston face.

2. In a hydraulic motor, a cylinder having reduced ends, pistons reciprocable within the ends thereof, seats between the end portions and the central portion of said cylinder, flexible diaphragms peripherally engaging said seats, said pistons having rounded faces engaged by said diaphragms, retaining means including a plurality of apertured walls engaging the adjacent sides of said diaphragms and operable to seal the marginal walls thereof, said apertured walls being rounded and having the same contour as said piston faces.

3. The invention defined by claim 2, said retaining means also including axially extending contacting annular walls integral with said apertured walls.

4. The invention defined by claim 2, said retaining means also including axially extending and contacting annular walls integral with said apertured walls, said piston faces and also the apertured retaining walls being bowed toward each other and held in position by said axial walls.

5. The invention defined by claim 2, together with spring means between said retaining means.

6. The invention defined by claim 2, together with spring means between said retaining means, the adjacent faces of the pistons and the adjacent walls of the retaining means being of concave outline.

ANTON F. ERICSON.